Oct. 22, 1963    R. J. BALDWIN    3,108,200
DYNAMO STATOR ASSEMBLIES HAVING RESILIENTLY MOUNTED FIELD COILS
Filed March 1, 1960

R. J. BALDWIN INVENTOR

BY *G. J. de Angeli* ATTORNEY

United States Patent Office 3,108,200
Patented Oct. 22, 1963

3,108,200
DYNAMO STATOR ASSEMBLIES HAVING RESILIENTLY MOUNTED FIELD COILS
Ronald J. Baldwin, Mount Vernon, N.Y., assignor to Otis Elevator Company, New York, N.Y., a corporation of New Jersey
Filed Mar. 1, 1960, Ser. No. 12,219
6 Claims. (Cl. 310—218)

The invention relates to dynamo stators and more particularly to improved means for securing field coils on pole pieces in dynamo stators.

A dynamo stator equipped with field coils, in general, comprises a field yoke of hollow, cylindrical construction which may also serve as the dynamo frame; a plurality of pole pieces mounted in a spaced, radial arrangement on the interior of the field yoke and extending inwardly toward the longitudinal axis of the cylinder, and one or more field coils mounted on each pole piece for exciting it. Each pole piece consists of a pole core, one end of which is attached to the yoke and the other end of which is formed into a pole shoe, the pole shoe being of larger cross-sectional area than the pole core. The field coils are mounted, encircling their respective pole cores and interposed between the pole shoe and the inside concave surface of the field yoke.

It is important for the proper operation of a dynamo that the field coils be held firmly in place on their respective pole pieces. In prior art dynamo stators, field coils are held in place by the use of either wooden blocks shaped to fit between the field coil and dynamo frame and then wedged into place, or by metal bands inserted between the coil and pole core, the midsections of the bands being welded to the pole core and their ends bent over the field coil. Both of these methods have the disadvantage of sometimes deforming the coil's shape and/or insulation during the wedging and bending operations. These operations must therefore be accomplished with great care in order to obtain a tight fit without damaging the coil. Other disadvantages are that the wooden blocks must be carefully shaped to conform to the contours of both the frame and coil at contiguous surfaces in order to avoid applying uneven pressure to the coil, and the metal bands by their thickness undesirably increase the mean circumference of the coil, resulting in increased heating of the dynamo during its operation. Furthermore, both these coil retaining devices lack resiliency and therefore do not adjust to changes in the physical dimensions of the stator components, as the components expand and contract under the influence of temperature variations. This lack of resiliency sometimes results in either an undesirable loose fit of the field coil or increased binding of the coil with resultant deformation of the coil and/or damage to its insulation.

It is also sometimes necessary, during the initial testing of the dynamo, to insert and remove the field coil several times. In such a case, when metal retaining bands are used, they sometimes become damaged and the entire pole piece must be removed in order to weld new retaining metal bands to it.

It is therefore an object of the invention to provide a dynamo stator having improved coil retaining means.

Another object of the invention is to provide a dynamo stator assembly in which the danger of deforming the coil shape and/or injuring the coil insulation is minimized during its assembly and operation.

A further object of the invention is to provide a dynamo stator assembly in which the field coil is resiliently retained on the pole piece and may be easily installed and removed.

In carrying out the invention according to the preferred embodiment, a resilient field coil retainer is positioned between the field coil and interior surface of the cylindrical field yoke. The retainer is shaped so that when the stator is assembled, the retainer is compressed and conforms to the inside contour of the cylindrical field yoke at points of engagement therewith and exerts uniformly applied forces on the field coil, thereby pressing it firmly against shoulders formed by the pole shoe to hold the coil resiliently in place.

Features and advantages of the invention will be seen from the above, from the following description when considered in conjunction with the drawings and from the appended claims.

Figure 1:
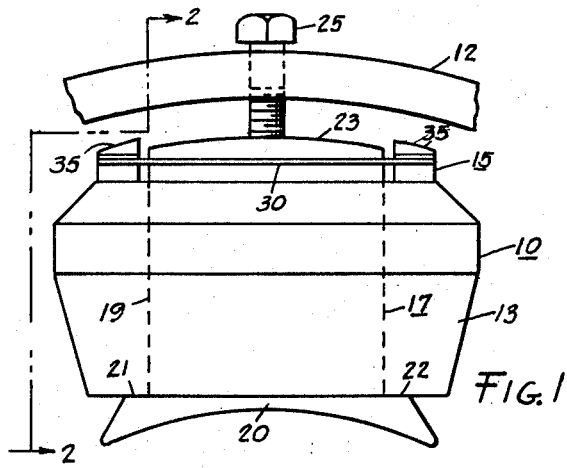
FIGURE 1 is a side elevational, partial view of the stator of a dynamo, showing a pole and field coil assembly loosely mounted on a field yoke (partially shown) and embodying the invention.

Referring to the drawings, the portion of the dynamo stator shown comprises a field pole and coil assembly, designated 10, radially mounted on the inside of a hollow, cylindrical field yoke 12 (partially shown). Field pole and coil assembly 10 consist of a field coil 13, a spring retainer 15 and a pole piece 17.

Pole piece 17 has a longitudinal core portion 19, of rectangular cross-sectional shape. One end is formed into a pole shoe 20, having laterally extending shoulders 21, 22. The other end 23 is curved to fit the inside surface of yoke 12 and is drilled and tapped to receive mounting bolts 25, extending radially through apertures formed in field yoke 12.

Field coil 13 is wound and shaped to encircle pole core 19. It is placed around the pole core from the attaching end 23 and is prevented from slipping off the pole shoe end of the core by shoulders 21, 22 of pole shoe 20.

Figure 5:
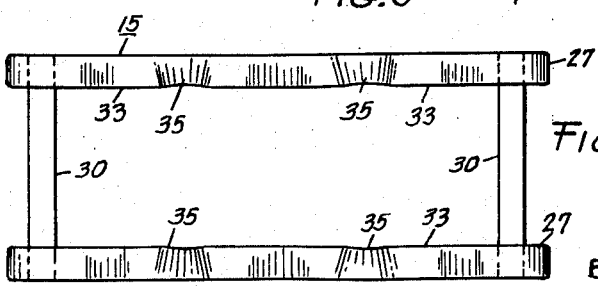
FIGURE 5 is a plan view of the resilient field coil retainer 15 of FIGURE 1.

Spring retainer 15 is in the form of a rectangular metal frame (FIGURE 5), having its two longest sides 27 made of undulated strips of spring steel and its two shortest sides 30 made of flat strips of mild steel. The interior dimensions of retainer 15 are such that it fits over and around attaching end 23 of pole core 19, while its exterior dimensions are substantially the same as the exterior dimensions of the field coil end against which it rests in its assembled position on core 19.

Field pole and coil assembly 10 is bolted to field yoke 12 with spring retainer 15 interposed between field coil 13 and the inside curved surface of the field yoke. In its assembled position spring retainer 15 is disposed with its spring steel strips 27 extending along the longitudinal axis of cylindrical field yoke 12. The undulations 33 formed along the full length of spring steel strip 27 are each of equal dimensions and their upper crests 35 are shaped to approximate somewhat the concave contour of the inside surface of yoke 12, with which surface they are in contact.

Figure 4:
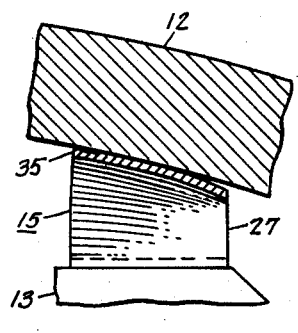
FIGURE 4 is a cross-sectional view taken along the line 4—4 of FIGURE 3.
Figure 2:
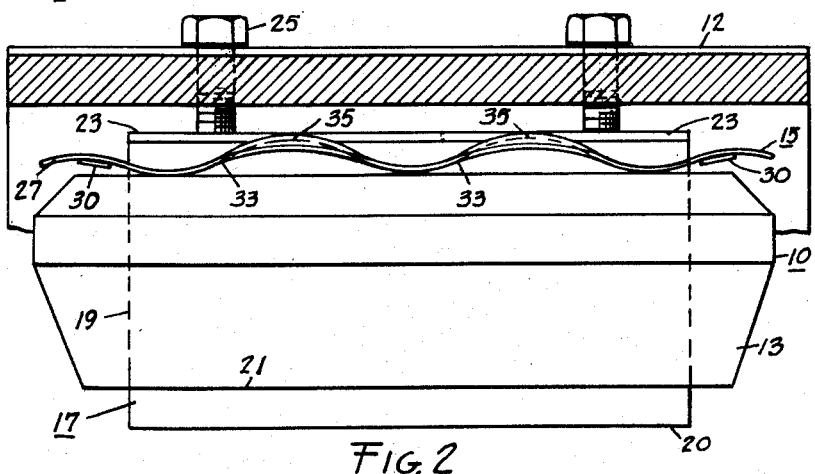
FIGURE 2 is a cross-sectional view taken along the line 2—2 of FIGURE 1.
Figure 3:
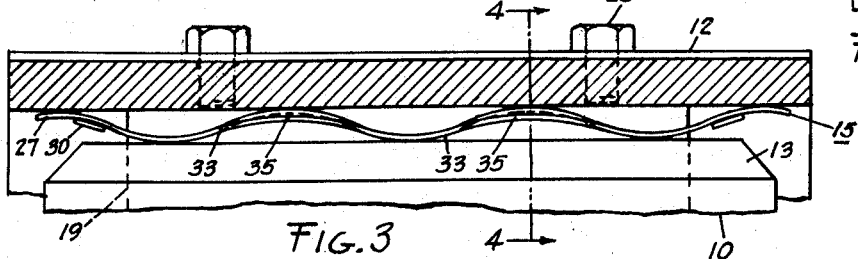
FIGURE 3 is a view similar to FIGURE 2, but showing the pole and field coil assembly securely mounted on the field yoke.

FIGURES 1 and 2 illustrate the configuration of spring retainer 15 with the field pole and coil assembly 10 loosely bolted to the yoke. As bolts 25 are tightened to secure field pole and coil assembly 10 firmly to yoke 12, the configuration of spring retainer 15 changes from that illustrated in FIGURES 1 and 2 (uncompressed configuration) to that illustrated in FIGURES 3 and 4 (compressed configuration). Bolts 25 are tightened until the curved end 23 of pole core 19 is flush against the inside surface of yoke 12. As these bolts are tightened, crests 35 deform to conform substantially to the concave contour of the contacting inside surface of yoke 12. Simultaneously, undulations 33 compress and spread out, applying compressive forces to the end of field coil 13 at uniformly spaced points of contact therewith. In this manner, crests 35 prevent sidewise shifting of retainer 15, while the lower troughs of undulations 33 lie flat against the coil end and press the coil firmly against shoulders 21 and 22 of pole shoe 17, thereby holding the field coil firmly but resiliently in place on the pole core.

It is seen that with the subject stator assembly the field coil is easily removable and installable without damage to its shape or insulation. Furthermore, spring retainer 15 adjusts and compensates for changes in the physical dimensions of the stator components which occur as those components expand and contract under the influence of temperature variations during the operation of the dynamo. This insures that the field coil, once it is installed, is held firmly in position without suffering damage to its shape and/or insulation during operation of the dynamo.

Although in the preferred embodiment spring retainer 15 is described as being in the form of a rectangular frame, its flat steel strips 30 merely serve to make easy the positioning of its undulated strips 27 during the assembly of the stator and these tying cross members 30 may be omitted. This is so, since undulated strips 27 may be correctly positioned even when not part of a rectangular frame and once compressed even slightly, the shape of crests 35 (previously described) is such that frictional engagement between the crests and the inside surface of yoke 12 is sufficient to maintain strips 27 in proper position.

Figure 6:
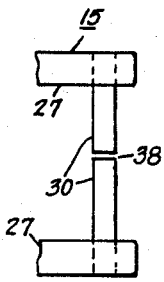
FIGURE 6 is a plan view of one end of retainer 15, modified as shown.

While the foregoing described embodiments of spring retainer 15 are both adapted for use with stators of D.C. dynamos, the embodiment using only the metal strips 27 as a spring retainer is especially adapted for use in stators of A.C. dynamos, wherein the rectangular metal configuration of spring retainer 15 might act as a short circuited coil, which action may not be desirable. Alternately, the rectangular metal configuration of spring retainer 15, if modified slightly, may be used in A.C. dynamos with the same advantages attendant to its use in D.C. dynamos. Such modification consists of cutting an air gap 38 (FIGURE 6) in one of the flat strips 30, thereby interrupting the magnetic path while retaining the "ease of positioning" advantage of the rectangular retainer.

As changes can be made in the above described construction and many apparently different embodiments of this invention can be made without departing from the scope thereof, it is intended that all matter contained in the above description or shown on the accompanying drawings be interpreted as illustrative only and not in a limiting sense.

What is claimed is:

1. In a dynamo stator assembly, a cylindrical field yoke having an inside concave surface, a field pole piece having a pole core portion and a pole shoe portion having shoulders, each shoulder having a surface laterally extending from said pole core portion, said pole core portion being intermediate said pole shoe and said yoke and having one end surface shaped to fit the concave curvature of the inside surface of said cylindrical field yoke, a field coil encircling said pole core and abutting said surfaces of said shoulders, means attaching said pole piece to the inside surface of said field yoke in a radially extending position with said shaped end abutting said inside concave surface, and a resilient member interposed and compressed between said inside concave surface of said yoke and said coil, said resilient member exerting on said inside concave surface conjugate reaction forces, each said force having one component acting in a direction substantially perpendicular to said surfaces of said shoulders and operative to press said coil against said surfaces of said shoulders, the second component of each reaction force acting substantially opposed to the corresponding component of the conjugate reaction force, whereby said coil and said resilient member are held in fixed relation to said pole core and said yoke.

2. In a dynamo stator assembly a cylindrical field yoke having an inside concave surface, a field pole piece having a pole core portion and a pole shoe portion having shoulders, each shoulder having a surface laterally extending from said pole core portion, said pole core portion being intermediate said pole shoe and said yoke and having one end surface shaped to fit the concave curvature of the inside surface of said cylindrical field yoke, a field coil encircling said pole core and abutting said surfaces of said shoulders, means attaching said pole piece to the inside surface of said field yoke in a radially extending position with said shaped end abutting said inside concave surface, and a resilient means interposed and compressed between said inside concave surface of said yoke and said coil, said resilient means including two co-acting members, each of said members exerting on said inside surface at least one reaction force, each reaction force exerted by one member having a component acting in substantial opposition to a component of a reaction force exerted by said other member, whereby said means and said coil are held in fixed relation to said inside surface.

3. A dynamo stator assembly as set forth in claim 1 wherein said resilient member comprises a rectangular frame having its two longer sides made of undulated strips of spring steel and its two shorter sides made of flat strips of metal, said frame being fitted over and around the shaped end of said pole core between said field coil and said inside surface of the yoke with said undulated strips disposed along the longitudinal axis of said cylindrical yoke, said undulations being of sufficient amplitude to be in compressive engagement with both said field coil and said yoke surface at points of contact therewith, the undulations contacting said yoke surface being shaped to approximate the curvature of said inside surface and when compressed conform to said curvature.

4. A dynamo stator assembly as set forth in claim 1 wherein said resilient member comprises a rectangular frame having its two longer sides made of undulated strips of spring steel, said frame being fitted over and around the shaped end of said pole core between said field coil and said inside surface of the yoke with said undulated strips disposed along the longitudinal axis of said cylindrical yoke, said undulations being of sufficient amplitude to be in compressive engagement with both said field coil and said inside surface at points of contact therewith, the undulations contacting said inside surface being shaped to approximate the curvature of said inside surface and when compressed conform to said curvature.

5. A dynamo stator assembly as set forth in claim 1 wherein said resilient member comprises a rectangular frame having its two longer sides made of undulated strips of spring steel and its two shorter sides made of flat strips of mild steel, one of said flat strips of mild steel having a transverse slot cut therein forming an air gap in said frame, said frame being loosely fitted around the shaped end of said pole core between said field coil and said inside surface of the yoke with said undulated strips disposed along the longitudinal axis of said cylindrical yoke, said undulations being of sufficient amplitude to be in compressive engagement with both said field coil and said inside surface at points of contact therewith, the undulations contacting said inside surface being shaped to approximate the curvature of said inside surface and when compressed conform to said curvature.

6. In a dynamo stator assembly, a cylindrical field yoke, a field pole piece having a pole core portion and pole shoe portion, said pole shoe portion being formed on one end of said pole core and providing laterally projecting shoulders, the other end of said pole core portion being shaped to fit the concave curvature of the inside surface of said cylindrical field yoke, a field coil encircling and fitted onto said pole core for exciting it, said shoulders of said pole shoe preventing said field coil from slipping off said pole core at said pole shoe end, means attaching said pole piece to the inside surface of said field yoke in a radially extending position with said shaped end adjacent said inside surface, and a pair of resilient longitudinal strips made of flat spring steel, each having a predetermined number of undulations of equal dimensions formed along its longitudinal length, each of which undulations has a crest and a trough, said strips being interposed between said inside surface of said yoke and said coil and disposed longitudinally along the longitudinal axis of said field yoke on opposite sides of said pole core, said crests being in compressive engagement with the adjacent inside surface of said yoke and said troughs being in compressive engagement with the adjacent surface of said coil, said crests being curved substantially to the shape of said adjacent inside surface of said yoke and when compressed conforming to that shape at points of contact therewith, thereby frictionally securing said resilient strips in position and pressing said field coil firmly and resiliently against said shoulders of said pole shoe.

References Cited in the file of this patent

UNITED STATES PATENTS

| | | |
|---|---|---|
| 1,300,859 | Ninkonow | Apr. 15, 1919 |
| 1,776,518 | McShane | Sept. 23, 1930 |
| 3,009,073 | Drabik et al. | Nov. 14, 1961 |